(12) United States Patent
Wong et al.

(10) Patent No.: US 10,897,324 B2
(45) Date of Patent: Jan. 19, 2021

(54) UPLINK ORTHOGONAL FREQUENCY MULTIPLE ACCESS (UL-OFDMA) RESOURCE UNIT (RU) DISTRIBUTION AMONG DEINTERLEAVERS

(71) Applicant: NXP USA, Inc., Austin, TX (US)

(72) Inventors: Sai Man Simon Wong, Cupertino, CA (US); Mao Yu, San Jose, CA (US); Nikolaj Larionov, Santa Clara, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/717,850

(22) Filed: Dec. 17, 2019

(65) Prior Publication Data

US 2020/0204298 A1 Jun. 25, 2020

Related U.S. Application Data

(60) Provisional application No. 62/783,049, filed on Dec. 20, 2018.

(51) Int. Cl.
*H04L 27/00* (2006.01)
*H04L 1/00* (2006.01)
*H04L 12/861* (2013.01)
*H04L 12/883* (2013.01)
*H04L 12/935* (2013.01)

(52) U.S. Cl.
CPC .......... *H04L 1/0052* (2013.01); *H04L 1/0071* (2013.01); *H04L 49/3027* (2013.01); *H04L 49/3063* (2013.01); *H04L 49/9021* (2013.01); *H04L 49/9057* (2013.01)

(58) Field of Classification Search
CPC . H04L 1/0052; H04L 1/0071; H04L 49/3027; H04L 49/3063; H04L 49/9021; H04L 49/9057
USPC ........................................................ 375/324
See application file for complete search history.

(56) References Cited

U.S. PATENT DOCUMENTS

| | | | |
|---|---|---|---|
| 7,233,612 B1* | 6/2007 | Zhang | H03M 13/27 375/130 |
| 7,954,016 B2* | 5/2011 | Pan | H03M 13/2764 714/701 |
| 8,572,456 B1* | 10/2013 | Pan | H03M 13/2775 714/755 |
| 10,110,406 B2* | 10/2018 | Yang | H04L 5/0023 |

(Continued)

*Primary Examiner* — Helene E Tayong

(57) ABSTRACT

A method for deinterleaving a plurality of resource units (RUs) where each RU includes data and parameters. The method includes assigning each RU into one of a first deinterleaver and a second deinterleaver and storing the parameters of each respective RU to a respective buffer in an order. The method also includes processing the data of the respective RU in the one of the first deinterleaver and the second deinterleaver and upon completion of the processing of the data of a respective RU, outputting the data of the respective RU from the one of the first deinterleaver and the second deinterleaver into which the respective RU was assigned, outputting the parameters of the respective RU corresponding to one of the first deinterleaver and the second deinterleaver into which the respective RU was assigned, and aligning the parameters of the respective RU with the data of the respective RU based on the order of storage of the parameters in the respective buffer.

22 Claims, 3 Drawing Sheets

(56) References Cited

U.S. PATENT DOCUMENTS

| | | | | |
|---|---|---|---|---|
| 2003/0021355 | A1* | 1/2003 | You | H04B 7/0613 |
| | | | | 375/267 |
| 2004/0162931 | A1* | 8/2004 | Hwang | H03M 13/27 |
| | | | | 711/5 |
| 2006/0236045 | A1* | 10/2006 | Keyes, Jr. | H04L 12/66 |
| | | | | 711/157 |
| 2007/0109956 | A1* | 5/2007 | Kwon | H04L 1/1812 |
| | | | | 370/208 |
| 2011/0305296 | A1* | 12/2011 | Van Nee | H04L 5/0053 |
| | | | | 375/295 |
| 2016/0073387 | A1* | 3/2016 | Yang | H04W 72/00 |
| | | | | 370/329 |

* cited by examiner

UPLINK ORTHOGONAL FREQUENCY MULTIPLE ACCESS (UL-OFDMA) RESOURCE UNIT (RU) DISTRIBUTION AMONG DEINTERLEAVERS

CROSS-REFERENCE TO RELATED APPLICATION

This disclosure claims the benefit under 35 U.S.C. § 119(e) of commonly-assigned U.S. Provisional Patent Application No. 62/783,049 filed Dec. 20, 2018, which is hereby incorporated by reference herein in its entirety.

FIELD OF USE

This disclosure relates generally to wireless communication systems, and more particularly, distribution of the UL-OFDMA RUs among deinterleavers for simultaneous processing in the wireless communication systems.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In WiFi UL-OFDMA transceivers, each packet contains multiple RUs (Resources units). The RUs are used in 802.1 lax WLAN to denote a group of subcarriers (tones) used in OFDMA for both DownLink (DL) and UpLink (UL) transmissions. Traditionally, a deinterleaver is shared among the RUs for processing over time. Each RU in the packet is to be deinterleaved independently and the deinterleaver can handle processing of a maximum 242 tones of data. Thus, one or more subsequent RUs need to wait until all the 242 tones of data in the deinterleaver is decoded and outputted by the deinterleaver. In addition, each RU can be of a different size and therefore it is difficult to determine exact duration of the processing time, causing processing latency and inefficiency in the system. One option is to increase the memory size of the deinterleaver in order to accommodate processing of the RUs having more than 242 tones of data. However, this option requires increase in the hardware, which results in increase in capacity and cost of the system.

SUMMARY

Implementations described herein provide a method for deinterleaving a plurality of resource units (RUs). Each RU includes data and parameters. The method includes assigning each RU in the plurality of the RUs into one of a first deinterleaver and a second deinterleaver and storing the parameters of each respective RU to a respective buffer corresponding to the one of the first deinterleaver and the second deinterleaver into which the respective RU was assigned. The parameters are stored in an order in the buffer. The method also includes processing the data of the respective RU in the one of the first deinterleaver and the second deinterleaver. Upon completion of the processing of the data of a respective RU by the one of the first deinterleaver and the second deinterleaver, the method further includes outputting the data of the respective RU from the one of the first deinterleaver and the second deinterleaver into which the respective RU was assigned, outputting the parameters of the respective RU from the respective buffer corresponding to the one of the first deinterleaver and the second deinterleaver into which the respective RU was assigned, and aligning the parameters of the respective RU with the data of the respective RU based on the order of storage of the parameters in the respective buffer.

In a first variant of the method according to the first implementation, the method includes assigning each of the plurality of the RUs to one of the first deinterleaver and the second deinterleaver based on aggregate size of data being processed in each of the first deinterleaver and the second deinterleaver.

In a second variant of the method according to the first implementation, the method includes determining whether the aggregate size of data being processed in the first deinterleaver is less than 242 tones.

In a third variant of the method according to the first implementation, the method includes in response to determining that the aggregate size of the data is less than 242 tones, assigning another RU in the plurality of RUs to the first deinterleaver.

In a fourth variant of the method according to the first implementation, the method includes in response to determining that the size of the data is not less than 242 tones, assigning another RU in the plurality of RUs to the second deinterleaver.

In a fifth variant of the method according to the first implementation, the method includes simultaneously processing data of one or more RUs in plurality of the RUs data in the first deinterleaver and data of one or more RUs in the plurality of RUs in the second deinterleaver.

In a sixth variant of the method according to the first implementation, the method includes storing the parameters of each respective RU to a respective buffer comprising storing the parameters to a respective first in/first out (FIFO) memory corresponding to the one of the first deinterleaver and the second deinterleaver into which the respective RU was assigned.

In a seventh variant of the method according to the first implementation, the method includes storing the parameters to a respective FIFO memory comprising storing the parameters in a first FIFO memory corresponding to the first deinterleaver and in a second FIFO memory corresponding to the second deinterleaver.

In an eighth variant of the method according to the first implementation, the method includes storing the parameters of each respective RU to a respective FIFO memory comprises storing the parameters of one or more RUs in the plurality of RUs assigned into the first deinterleaver in the first FIFO memory and storing the parameters of one or more RUs in the plurality of RUs assigned into the second deinterleaver in the second FIFO memory.

In a ninth variant of the method according to the first implementation, the method includes aligning the parameters of the respective RU with the data of the respective RU comprises outputting the parameters from first FIFO memory when the data of the RU starts reading from the first deinterleaver and outputting the parameters from the second FIFO memory when the data of the RU starts reading from the second deinterleaver.

In a tenth variant of the method according to the first implementation, the method includes processing the data of the respective RU comprises one of processing the data having same size in each of the plurality of RUs or processing the data having a variable size in each of the plurality of RUs.

A first communication device for deinterleaving a plurality of resource units (RUs) in accordance with a second implementation of the subject matter of this disclosure, includes a network interface including one or more transceivers, which are configured to assign each RU in the plurality of the RUs into one of a first deinterleaver and a second deinterleaver and store the parameters of each respective RU to a respective buffer corresponding to the one of the first deinterleaver and the second deinterleaver into which the respective RU was assigned, wherein the parameters are stored in an order in the buffer. The one or more transceivers are also configured to process the data of the respective RU in the one of the first deinterleaver and the second deinterleaver. Upon completion of the processing of the data of a respective RU by the one of the first deinterleaver and the second deinterleaver, the one or more transceivers are further configured to output the data of the respective RU from the one of the first deinterleaver and the second deinterleaver into which the respective RU was assigned, output the parameters of the respective RU from the respective buffer corresponding to the one of the first deinterleaver and the second deinterleaver into which the respective RU was assigned, and align the parameters of the respective RU with the data of the respective RU based on the order of storage of the parameters in the respective buffer.

BRIEF DESCRIPTION OF THE DRAWINGS

Further features of the disclosure, its nature and various potential advantages will become apparent upon consideration of the following detailed description, taken in conjunction with the accompanying drawings, in which like reference characters refer to like parts throughout, and in which.

DETAILED DESCRIPTION

In accordance with implementations of the present disclosure, provided herein is a method and system for distribution of the UL-OFDMA RUs among deinterleavers for simultaneous processing of variable sized RUs in a wireless communication system. In implementations described below, a wireless network device such as an access point (AP) of a wireless local area network (WLAN) transmits data streams to one or more client stations. In some implementations, the AP includes at least one deinterleaver unit configured to distribute multiple RUs and process/deinterleave the data in these distributed RUs. In some implementations, the deinterleaver unit includes a first deinterleaver and a second deinterleaver, which is a duplicate of the first deinterleaver. In one implementation, each of the RUs are assigned to one of the first deinterleaver or the second deinterleaver for processing based on aggregated size of data of one or more RUs being processed in one of the first or the second deinterleavers, respectively. As discussed above, a deinterleaver can handle processing of a maximum 242 tones of data. For example, if the aggregated size of data being processed in the first deinterleaver reaches its limit of 242 tones of data, then each subsequent RU is assigned to the second deinterleaver for processing. In some implementations, the delinterleaver unit also includes a buffer assigned to each of the first and the second deinterleaver to store parameters of the data in a specific order to align parameters with the processed data in each of the RUs corresponding to each of the first and the second deinterleavers. Such a technique for distributing the RUs among the two same deinterleavers is scalable, requiring less hardware with simultaneous processing of multiple RUs, resulting in a cost effective, faster, and efficient wireless communication system.

Figure 1:
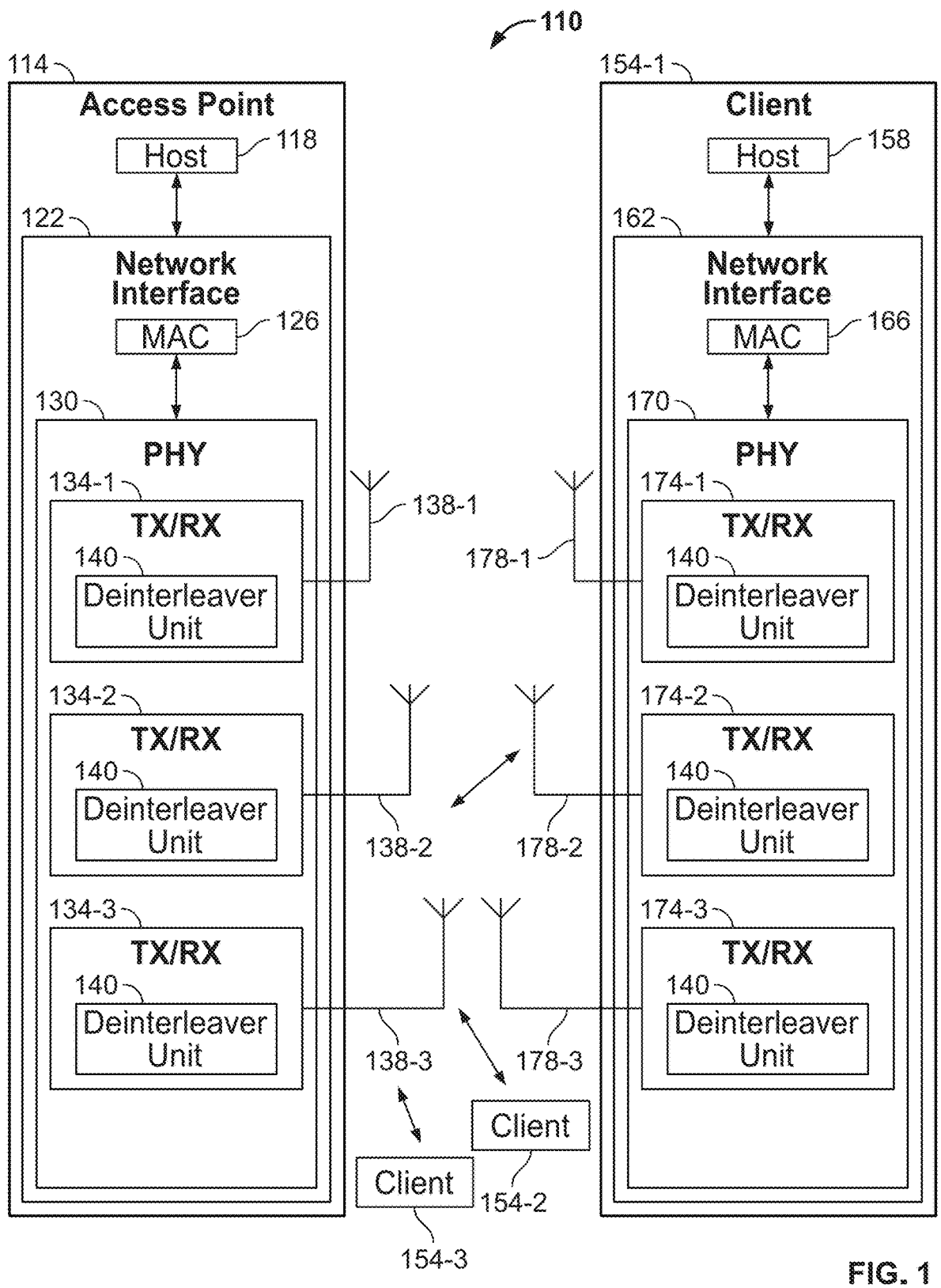
FIG. 1 is a block diagram of an example wireless local area network (WLAN) for distribution of the UL-OFDMA RUs among deinterleavers for simultaneous processing in the wireless communication systems, in accordance with an implementation of the present disclosure.

FIG. 1 is a block diagram of an example WLAN 110, according to an implementation. The WLAN 110 includes an access point (AP) 114 that comprises a host processor 118 coupled to a network interface device 122. The network interface device 122 includes a medium access control (MAC) processor 126 and a physical layer (PHY) processor 130. A MAC processor 126 functions to control transmission of data packets in an out over physical links in the WLAN 110. The PHY processor 130 functions to connect the MAC processor 130 to a physical transmission medium (e.g. optical fiber or copper cable) for synchronized communication. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in another implementations. In some implementations, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In various implementations, the MAC processor 126 and/or the PHY processor 130 of the AP 114 are configured to generate data units, and process received data units, that conform to a WLAN communication protocol such as a communication protocol conforming to the IEEE 802.11 ax Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130.

The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 includes circuitry (e.g., in the transceivers 134) configured to upconvert baseband signals to radio frequency (RF) signals for wireless transmission via the antennas 138.

Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units. The PHY processor 130 includes circuitry (e.g., in the transceivers 134) configured to downconvert RF signals received via the antennas 138 to baseband signals.

In one implementation, the receivers of the transceivers 134 are UL-OFDMA receivers including packets such that each of the packets contain multiple RUs, e.g. RU1, RU2, RU3 . . . RUx. Each of the RUs include data and parameters assigned to the data. In one implementation, each of the RUs may include data of same size. In another implementation, each of the RUs may include data of varied sizes of tones. In one example, a single tone includes 1 bit. In another example a single tone includes 10 bits.

In one implementation, one or more of the transceivers 134 include a deinterleaver unit 140 configured to distribute the multiple RUs and process/deinterleave the data in the distributed RUs. In some implementations, the deinterleaver unit 140 includes a first deinterleaver 142 and a second deinterleaver 144 (See FIG. 2) such that the RUs are assigned to one of the first deinterleaver 142 or the second deinterleaver 144 for processing based on aggregated size of data of one or more RUs being processed in one of the first or the second deinterleavers 142 or 144 respectively. The deinterleaver unit 140 also includes a buffer 141 having a first first in/first out (FIFO) memory 143 (See FIG. 2) and a second FIFO memory 145 (See FIG. 2). The buffer 141 functions to store parameters of the RUs assigned to the first and the second deinterleavers 142 and 143, respectively. Details of these components of the deinterleaver unit 140 are described further below with respect to FIG. 2.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various implementations. The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other implementations. In some implementations, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In various implementations, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol.

The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 includes circuitry (e.g., in the transceivers 174) configured to upconvert baseband signals to RF signals for wireless transmission via the antennas 178.

Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units. The PHY processor 170 includes circuitry (e.g., in the transceivers 174) configured to downconvert RF signals received via the antennas 178 to baseband signals.

Similarly, the Rx of the transceivers 174 are UL-OFDMA receivers including packets such that each of the packets contain multiple RUs, e.g. RU1, RU2, RU3 . . . RUx. In one implementation, one or more of the transceivers 174 includes a deinterleaver unit 180, which is structured to function similar to the deinterleaver unit 140 (See FIG. 2).

In an implementation, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an implementation.

Figure 2:
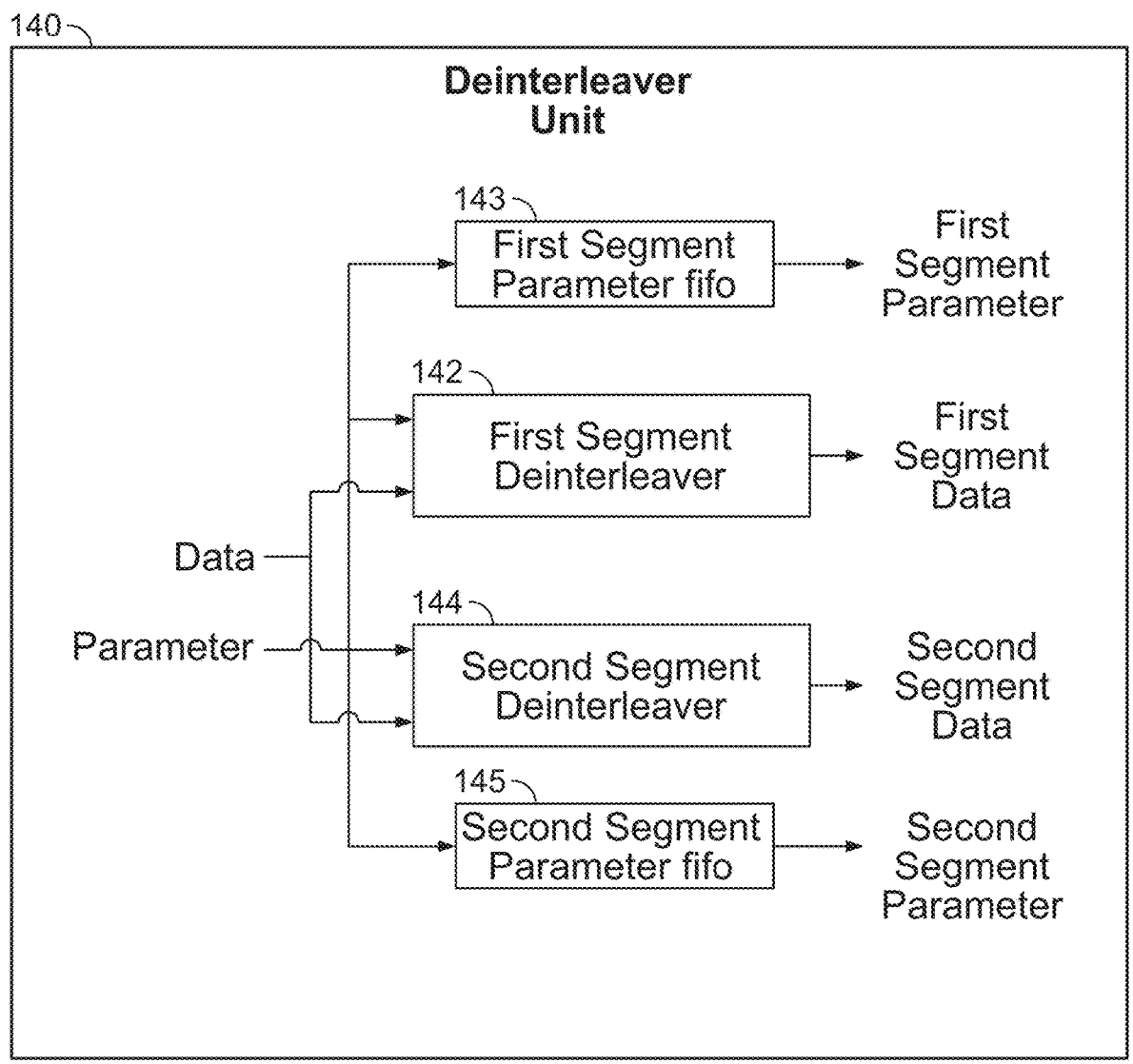
FIG. 2 is a block diagram of an example of a deinterleaver unit of FIG. 1, in accordance with an implementation of the present disclosure.

FIG. 2 is a block diagram of the deinterleaver unit 140 configured to distribute and deinterleave the RUs. As discussed above, the deinterleaver unit 140 includes a first deinterleaver 142, a buffer 141 having a first FIFO memory 143 corresponding to the first deinterleaver 142, a second deinterleaver, the buffer 141 having a second FIFO memory 145 and a corresponding to the second deinterleaver 144.

In some implementations, the deinterleaver unit 140 receives a series of multiple RUs, e.g. RU1, RU2, RU3 . . . RUx over a period of time. As discussed above, each RU includes data (e.g. high efficiency WLAN data) and at least one parameter (e.g., sub-channel allocation, uplink (physical layer protocol data unit) PPDU length, frequency domain control etc.). Also, as discussed above, each of the multiple RUs could be of the same size (i.e. same number of tones) or variable size (i.e. different number of tones). In some implementations, the deinterleaver unit 140 assigns one or more series of multiple RUs to either the first deinterleaver 142 or the second deinterleaver. In one implementation, the deinterleaver unit 140 assigns one or more of the multiple RUs to the first deinterleaver 142. The data and the parameter(s) assigned to each of the one or more multiple RUs are written into the first deinterleaver 142 such that the data is processed using the parameters. Also, the parameters assigned to the one or more multiple RUs are stored in the first FIFO memory 143 for transmission further downstream with the processed RU from the first deinterleaver 142, for subsequent processing, and it is important to properly match up each set of parameters with the corresponding processed RU. In one example, the deinterleaver unit 140 pushes the parameters into the first FIFO memory 143 when data of the one or multiple RUs start writing into the first deinterleaver 142. Accordingly, the parameter in the first FIFO memory 143 is pushed out of the first deinterleaver 142 in the order it was pushed in the first FIFO memory 143 to ensure alignment with the corresponding processed RU. In some implementations, data of the one or more multiple RUs are being processed in the first deinterleaver 142. In one example, the deinterleaver unit 140 receives a first RU, e.g. RU1 in the series of multiple RUs. The deinterleaver unit 140 assigns the RU1 to the first deinterleaver 142 such that the data and the parameter(s) of the first RU1 are written into the first deinteleaver 142 for processing and the parameters are also stored in the first FIFO memory 143.

In one implementation, the deinterleaver unit 140 receives a subsequent RU among the series of multiple RUs. For example, the subsequent RU is RU2 in the series of multiple RUs. In one implementation, the deinterleaver unit 140 determines whether a cumulative size of data of one or more of the multiple RUs, which are currently being processed in the first deinterleaver 142 is less than 242 tones. In one example, the data size of the one RU being currently processed in the first deinterleaver 142 is less than 242 tones. In another example, the data size of multiple RUs being currently processed in the first deinterleaver 142 is less than 242 tones. If it is determined that the cumulative size of the data is less than 242 tones, then the deinterleaver unit 140 assigns the subsequent RU to the first deinterleaver 142 for processing. In one implementation, the data and the parameters of the subsequent RU are written into the first deinterleaver 142 and the parameters are also stored into the first FIFO memory 143. If it is determined that the cumulative size of data is greater than 242 tones, then the deinterleaver unit 140 assigns the subsequent RU to the second deinterleaver 144 for processing. In one example, the data size of the one RU being currently processed in the first deinterleaver 142 is greater than 242 tones. In another example, the data size of multiple RUs being currently processed in the first deinterleaver 144 is greater than 242 tones. In another implementation, data, and the parameters of the subsequent RU are written into the second deinterleaver 144 and the parameter is stored in the second FIFO memory 145 for subsequent transmission further downstream into the processed data of the RU in the second deinterleaver 144. In one example, the deinterleaver unit 140 pushes the parameters into the second FIFO memory 145 when data of the subsequent RU starts writing into the second deinterleaver 142. Accordingly, the data of the subsequent RUs assigned to the second deinterleaver 144 are processed simultaneously with the one or more of the multiple RUs in the first deinterleaver 142. In one example, the subsequent RU is RU2 in the series of multiple RUs. The deinterleaver unit 140 assigns the RU2 to the second deinterleaver 144 such that the data and the parameters of the second RU2 are written into the second deinteleaver 144 for processing and the parameters are also stored in the second FIFO 145. In some implementations, the deinterleaver unit 140 repeats the process of assigning each of the RUs in one of the first or the second deinterleaver, processing the data in the respective assigned deinterleaver and storing the parameters in the FIFO corresponding to the assigned detinterleaver for each of the RUs received over time. In one implementation, for a 160 Mhz packet including multiple RUs, two of the 242 tones of data are processed in parallel by the first and the second deinterleavers 142 and 144, respectively.

In some alternate implementations, the deinterleaver unit 140 includes a counter 150 that functions to increment a value based on the tones of data in each of the RUs received at the deinterleaver unit 140. For example, initially the value of the counter 150 is 0 and if number of tones in RU are 26, value of the counter 150 is incremented by 1, if number of tones in RU are 52, the value of counter 150 is incremented by 2, if the number of tones in RU are 106, the value of the counter 150 is incremented by 4 and if the number of tones in RU are 242, the value of the counter 150 is incremented by 8. In this example, the deinterleaver assigns 8 RUs to the first deinterleaver 142 prior to switching a subsequent RU to the second deintereleaver 144, for processing.

In some implementations, each of the first deinterleaver 142 and the second deinterleaver 144 outputs the processed data of its respective RU. In one implementation, the data of the RU is read from each of the first and the second deinterleavers 142 and 144, respectively. In some implementations, the deinterleaver unit 140 outputs the parameters stored in the first FIFO memory 143 and aligns these parameters with the corresponding RU of the processed data outputted from the first deinterleaver 142 in order to properly match up the parameters with the corresponding processed RU for subsequent processing. In one implementation, the parameters stored in the first FIFO memory 143 corresponding to the RU in the first deinterleaver 142 are outputted when data of the RU starts reading from the first deinterleaver 142. As discussed above the parameters of the RU are stored both in the first deinterleaver 142 and the corresponding first FIFO memory 143 for subsequent transmission further downstream with the processed data of the RU in the first deinterleaver 142. In one example, the first deinterleaver 142 sends a signal identifying the RU of which the data has been completely processed, and to start reading the data from this RU. Upon detection of this signal, the deinterleaver unit 140 pushes out the parameters corresponding to the data of the identified RU from the first FIFO memory 143 for transmission further downstream with the processed identified RU from the first deinterleaver 142 for subsequent processing. Similarly, in other implementations, the deinterleaver unit 140 outputs the parameters stored in the second FIFO memory 145 and aligns these parameters with the corresponding RU of the processed data outputted from the second deinterleaver 144 in order to properly match up the parameters with the corresponding processed RU for subsequent processing. In one implementation, the parameters stored in the second FIFO memory 145 corresponding to the RU in the second deinterleaver 144 are outputted when data of the RU starts reading from the second deinterleaver 144. In one example, the second deinterleaver 144 sends a signal identifying the RU of which the data has been completely processed, and to start reading the data from this RU. Upon detection of this signal, the deinterleaver unit 140 pushes out the parameters corresponding to the data of the identified RU from the second FIFO memory 145 for transmission further downstream with the processed identified RU from the second deinterleaver 144 for subsequent processing.

Figure 3:
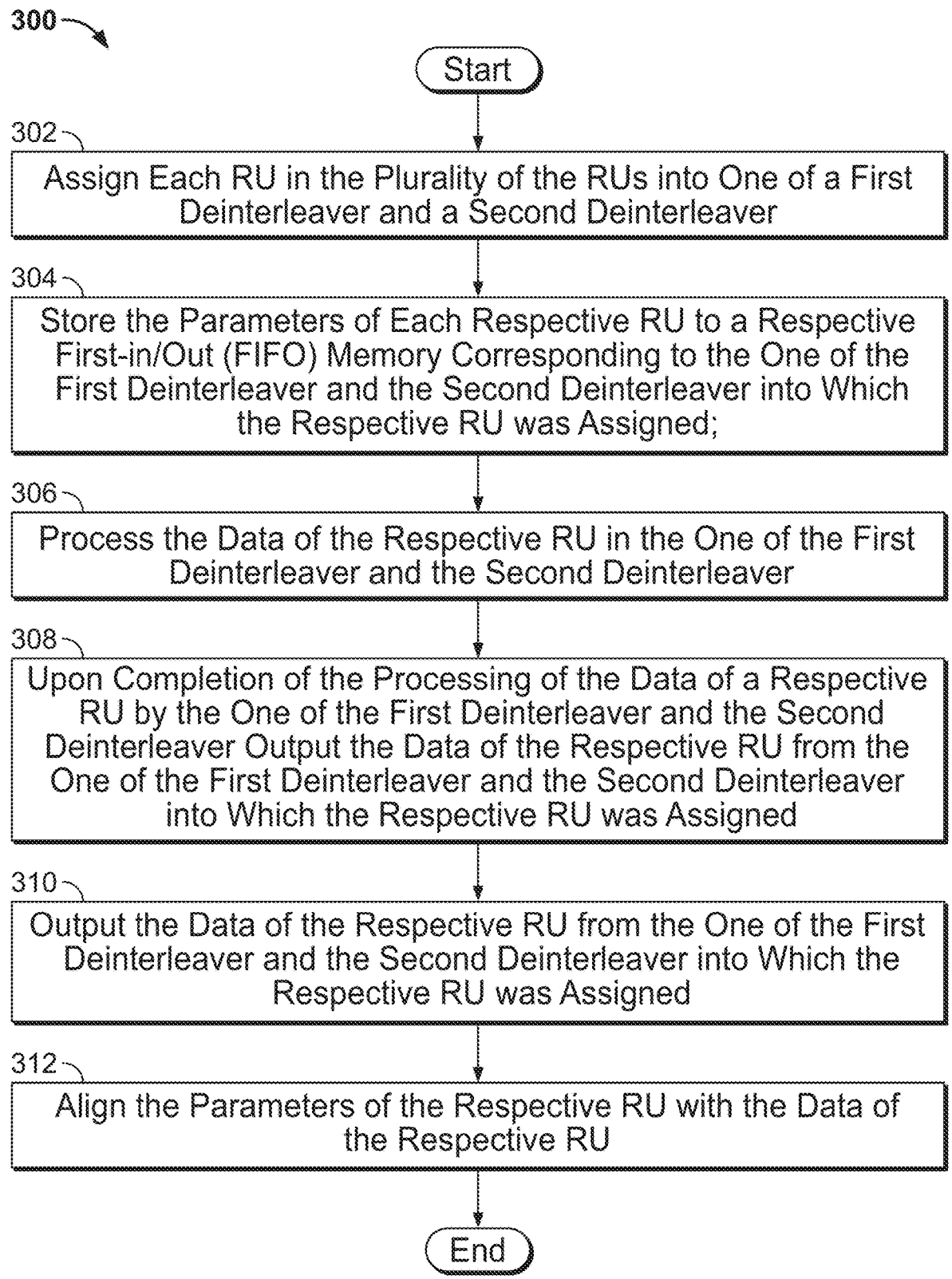
FIG. 3 is a high-level flow chart for a process for deinterleaving the RUs utilizing the deinterleaver units of FIG. 1 and FIG. 2, in accordance with an implementation of the present disclosure.

FIG. 3 provides an example logic flow diagram of a method 300 for deinterleaving a plurality of resource units (RUs). In one implementation, a deinterleaver unit (e.g. deinterleaver unit 140) in a transceiver (e.g. 134-1) of an access point (e.g. AP 114) is configured to implement the method 300 to deinterleave the RUs to be transmitted to the client station (e.g. client station 154-1 of FIG. 1). In other implementations, however, the method 300 is implemented by a deinterleaver unit (e.g. deinterleaver unit 180) in a transceiver (e.g. 174-1 of FIG. 1) in the client station (e.g. client station 154-1 of FIG. 1) to deinterleave the RUs to be transmitted to an access point (e.g. AP 114) or is implemented by another suitable communication device.

At block 302, each of the plurality of RUs are assigned into one of a first deinterleaver or a second deinterleaver. As discussed above, each of the plurality of RUs could be of the same size (i.e. a same number of tones) or variable size (i.e. a different number of tones). In one implementation, it is determined whether an aggregate size of data of one or more RUs being processed in the first deinterleaver 142 is less than 242 tones. If it is determined that the aggregated size of data is less than 242 tones, then a subsequent RU is assigned to the first deinterleaver 142. If it is determined that the aggregated size of data is greater than 242 tones, then the subsequent RU is assigned to the second deinterleaver 144. At block 304, parameters of each of the respective RUs are stored into a respective first-in/first-out (FIFO) memory corresponding to the one of the first deinterleaver and the second deinterleaver into which the respective RU is assigned. In one example, parameters of the RU assigned to the first deinterleaver 142 are stored in the first FIFO memory 143 corresponding to the first deinterleaver 142. In another example, parameters of the RU assigned to the second deinterleaver 144 are stored in the second FIFO memory 145 corresponding to the second deinterleaver 144. At block 306, process the data of the respective RU in the one of the first deinterleaver and the second deinterleaver. In one implementation, the data of each of the RUs assigned to their respective first and the second deinterleavers 142 and 144 respectively are simultaneously processed.

At block 308, upon completion of the processing of the data of a respective RU by the one of the first deinterleaver and the second deinterleaver, output the data of the respective RU from the one of the first deinterleaver and the second deinterleaver into which the respective RU was assigned. In one implementation, the data of the RU is read from each of the first and the second deinterleavers 142 and 144, respectively. At block 310, output the parameters of the respective RU from the first-in/first-out (FIFO) memory corresponding to the one of the first deinterleaver and the second deinterleaver into which the respective RU was assigned. At block 312, align the parameters of the respective RU with the data of the respective RU. In some implementations, parameters of the RU from the first FIFO memory 143 are aligned with the RU assigned to the first deinterleaver 142. In one example, the first deinterleaver 142 identifies the RU from which to start reading the data in order to align the parameters from the first FIFO memory 143 with the data of the identified RU. In one implementation, the parameters stored in the first FIFO memory 143 corresponding to the RU in the first deinterleaver 142 are outputted when data of the RU starts reading from the first deinterleaver 142. In other implementations, parameters of the RU from the second FIFO memory 244 are aligned with the RU assigned to the second deinterleaver 144. In another example, the second deinterleaver 144 identifies the RU from which to start reading the data in order to align the parameters from the second FIFO memory 145 with the data of the identified RU. In one implementation, the parameters stored in the second FIFO memory 145 corresponding to the RU in the second deinterleaver 144 are outputted when data of the RU starts reading from the second deinterleaver 144.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

Various implementations and components disclosed herein are configured to be at least partially operated and/or implemented by processor-executable instructions stored on one or more transitory or non-transitory processor-readable media. When implemented in hardware, the hardware may comprise one or more of discrete components, an integrated circuit, an application-specific integrated circuit (ASIC), a programmable logic device (PLD), etc.

While various implementations of the present disclosure have been shown and described herein, such implementations are provided by way of example only. Numerous variations, changes, and substitutions relating to implementations described herein are applicable without departing from the disclosure. It is noted that various alternatives to the implementations of the disclosure described herein may be employed in practicing the disclosure. It is intended that the following claims define the scope of the disclosure and that methods and structures within the scope of these claims and their equivalents be covered thereby.

While the present invention has been described with reference to specific examples, which are intended to be illustrative only and not to be limiting of the invention, changes, additions and/or deletions may be made to the disclosed implementations without departing from the scope of the invention.

While operations are depicted in the drawings in a particular order, this is not to be construed as requiring that such operations be performed in the particular order shown or in sequential order, or that all illustrated operations be performed to achieve the desirable results. The subject matter of this specification has been described in terms of particular aspects, but other aspects can be implemented and are within the scope of the following claims. For example, the actions recited in the claims can be performed in a different order and still achieve desirable results. As one example, the process depicted in FIG. 3 does not necessarily require the particular order shown, or sequential order, to achieve desirable results. In certain implementations, multitasking and parallel processing may be advantageous. Other variations are within the scope of the following claims.

What is claimed is:

1. A method for deinterleaving a plurality of resource units (RUs), each RU comprising data and parameters, the method comprising:
assigning each RU in the plurality of the RUs into one of a first deinterleaver and a second deinterleaver;
storing the parameters of each respective RU to a respective buffer corresponding to the one of the first deinterleaver and the second deinterleaver into which the respective RU was assigned, wherein the parameters are stored in an order in the buffer;

processing the data of the respective RU in the one of the first deinterleaver and the second deinterleaver; and upon completion of the processing of the data of a respective RU by the one of the first deinterleaver and the second deinterleaver:

outputting the data of the respective RU from the one of the first deinterleaver and the second deinterleaver into which the respective RU was assigned, outputting the parameters of the respective RU from the respective buffer corresponding to the one of the first deinterleaver and the second deinterleaver into which the respective RU was assigned, and aligning the parameters of the respective RU with the data of the respective RU based on the order of storage of the parameters in the respective buffer.

2. The method of claim 1, further comprising assigning each of the plurality of the RUs to one of the first deinterleaver and the second deinterleaver based on aggregate size of data being processed in each of the first deinterleaver and the second deinterleaver.

3. The method of claim 2, further comprising:
determining whether the aggregate size of data being processed in the first deinterleaver is less than 242 tones.

4. The method of claim 3, further comprising, in response to determining that the aggregate size of the data is less than 242 tones, assigning another RU in the plurality of RUs to the first deinterleaver.

5. The method of claim 3, further comprising, in response to determining that the size of the data is not less than 242 tones, assigning another RU in the plurality of RUs to the second deinterleaver.

6. The method of claim 5, further comprising simultaneously processing data of one or more RUs in plurality of the RUs data in the first deinterleaver and data of one or more RUs in the plurality of RUs in the second deinterleaver.

7. The method of claim 1, wherein storing the parameters of each respective RU to a respective buffer comprising storing the parameters to a respective first in/first out (FIFO) memory corresponding to the one of the first deinterleaver and the second deinterleaver into which the respective RU was assigned.

8. The method of claim 7, wherein storing the parameters to the respective FIFO memory comprising storing the parameters in a first FIFO memory corresponding to the first deinterleaver and in a second FIFO memory corresponding to the second deinterleaver.

9. The method of claim 7, wherein storing the parameters of each respective RU to the respective FIFO memory comprises storing the parameters of one or more RUs in the plurality of RUs assigned into the first deinterleaver in the first FIFO memory and storing the parameters of one or more RUs in the plurality of RUs assigned into the second deinterleaver in the second FIFO memory.

10. The method of claim 9, wherein aligning the parameters of the respective RU with the data of the respective RU comprises outputting the parameters from the first FIFO memory when the data of the RU starts reading from the first deinterleaver and outputting the parameters from the second FIFO memory when the data of the RU starts reading from the second deinterleaver.

11. The method of claim 1, wherein processing the data of the respective RU comprises one of processing the data having same size in each of the plurality of RUs or processing the data having a variable size in each of the plurality of RUs.

12. A first communication device comprising:
a network interface device comprising one or more transceivers configured to:
assign each resource unit (RU) in a plurality of the RUs into one of a first deinterleaver and a second deinterleaver;
store parameters of each respective RU to a respective buffer corresponding to the one of the first deinterleaver and the second deinterleaver into which the respective RU was assigned, wherein the parameters are stored in an order in the buffer;
process data of the respective RU in the one of the first deinterleaver and the second deinterleaver; and
upon completion of the processing of the data of a respective RU by the one of the first deinterleaver and the second deinterleaver:
output the data of the respective RU from the one of the first deinterleaver and the second deinterleaver into which the respective RU was assigned,
output the parameters of the respective RU from the respective buffer corresponding to the one of the first deinterleaver and the second deinterleaver into which the respective RU was assigned, and
align the parameters of the respective RU with the data of the respective RU based on the order of storage of the parameters in the respective buffer.

13. The first communication device of claim 12, wherein the one or more transceivers are configured to:
assign each of the plurality of the RUs to one of the first deinterleaver and the second deinterleaver based on aggregate size of data being processed in each of the first deinterleaver and the second deinterleaver.

14. The first communication device of claim 12, wherein the one or more transceivers are further configured to determine whether the aggregate size of data being processed in the first deinterleaver is less than 242 tones.

15. The first communication device of claim 14, wherein in response to determining that the aggregate size of the data is less than 242 tones, the one or more transceivers are further configured to assign another RU in the plurality of RUs to the first deinterleaver.

16. The first communication device of claim 14, wherein in response to determining that the aggregate size of the data is not less than 242 tones, the one or more transceivers are further configured to assign another RU in the plurality of RUs to the second deinterleaver.

17. The first communication device of claim 16, wherein the one or more transceivers are further configured to simultaneously process data of one or more RUs in plurality of the RUs data in the first deinterleaver and data of one or more RUs in the plurality of RUs in the second deinterleaver.

18. The first communication device of claim 12, wherein the respective buffer comprises a respective first in/first out (FIFO) memory configured to store the parameters of each respective RU corresponding to one of the first deinterleaver and the second deinterleaver into which the respective RU was assigned.

19. The first communication device of claim 18, wherein the respective FIFO memory comprises a first FIFO memory corresponding to the first deinterleaver and a second FIFO memory corresponding to the second deinterleaver.

20. The first communication device of claim 19, wherein to store the parameters of each respective RU to the respective FIFO memory, the one or more transceivers are further configured to store the parameters of one or more RUs in the plurality of RUs assigned into the first deinterleaver in the first FIFO memory and store the parameters of one or more RUs in the plurality of RUs assigned into the second deinterleaver in the second FIFO memory.

21. The first communication device of claim 20, wherein to align the parameters of the respective RU with the data of the respective RU, the one or more transceivers are further configured to output the parameters from the first FIFO memory when the data of the RU starts reading from the first deinterleaver and output the parameters from the second FIFO memory when the data of the RU starts reading from the second deinterleaver.

22. The first communication device of claim 12, wherein the one or more transceivers are configured to:
    process the data having same size in each of the plurality of RUs or process the data having a variable size in each of the plurality of RUs.

* * * * *